(12) United States Patent
Smaniotto et al.

(10) Patent No.: US 12,229,793 B2
(45) Date of Patent: *Feb. 18, 2025

(54) MACHINE LEARNING TECHNOLOGIES FOR IDENTIFYING CATEGORY PURCHASES AND GENERATING DIGITAL PRODUCT OFFERS

(71) Applicant: FETCH REWARDS, LLC, Chicago, IL (US)

(72) Inventors: Anthony David Smaniotto, Portage, IN (US); Ankit Patel, Union City, NJ (US)

(73) Assignee: Fetch Rewards, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,202

(22) Filed: Mar. 19, 2024

(65) Prior Publication Data

US 2024/0338726 A1 Oct. 10, 2024

Related U.S. Application Data

(63) Continuation of application No. 18/132,735, filed on Apr. 10, 2023, now Pat. No. 11,941,655.

(51) Int. Cl.
*G06Q 30/02* (2023.01)
*G06Q 30/0202* (2023.01)
*G06Q 30/0207* (2023.01)
*G06Q 30/0241* (2023.01)

(52) U.S. Cl.
CPC ..... *G06Q 30/0224* (2013.01); *G06Q 30/0202* (2013.01); *G06Q 30/0222* (2013.01); *G06Q 30/0277* (2013.01)

(58) Field of Classification Search
CPC ........... G06Q 30/0224; G06Q 30/0202; G06Q 30/0222; G06Q 30/0277
See application file for complete search history.

(56) References Cited

U.S. PATENT DOCUMENTS

| | | | |
|---|---|---|---|
| 10,861,077 B1* | 12/2020 | Liu ......................... | G06Q 30/06 |
| 2011/0125561 A1* | 5/2011 | Marcus .............. | G06Q 30/0213 |
| | | | 705/14.15 |
| 2017/0262926 A1* | 9/2017 | High ................... | G06K 7/10712 |
| 2017/0300939 A1* | 10/2017 | Chittilappilly ...... | G06Q 30/0207 |
| 2018/0225633 A1* | 8/2018 | Kenthapadi ........ | G06Q 10/1053 |
| 2021/0035188 A1 | 2/2021 | Ksyta et al. | |
| 2021/0142366 A1* | 5/2021 | Umeh ................ | G06Q 30/0269 |

(Continued)

OTHER PUBLICATIONS

University of Chicago, "Too many metrics! Measuring social media's impact" (Year: 2016).*

(Continued)

*Primary Examiner* — Breffni Baggot
(74) *Attorney, Agent, or Firm* — Barnes & Thornburg LLP

(57) ABSTRACT

Systems and methods for using machine learning to determine product offers for individuals are disclosed. According to certain aspects, the systems and methods may determine, using a machine learning model and based on a set of products purchased by a user, a set of digital offers associated with an additional set of products to provide to the user. The user may redeem any of the digital offers, and the systems and methods may use any additional product purchase information to update the machine learning model for use in subsequent analyses.

17 Claims, 7 Drawing Sheets

(56) References Cited

U.S. PATENT DOCUMENTS

2021/0182934 A1* 6/2021 Semarjian .......... G06Q 30/0631
2021/0365973 A1* 11/2021 Guild ................. G06Q 30/0235
2022/0391938 A1 12/2022 Sridhar
2022/0405796 A1 12/2022 Yuvaraj

OTHER PUBLICATIONS

Approaches to Machine Learning, P. Langley at Carnegie-Mellon University (Year: 1984).*
International Application No. PCT/US2024/023658, International Search Report and Written Opinion, mailed Jun. 4, 2024.

* cited by examiner

MACHINE LEARNING TECHNOLOGIES FOR IDENTIFYING CATEGORY PURCHASES AND GENERATING DIGITAL PRODUCT OFFERS

CROSS-REFERENCE TO RELATED APPLICATIONS

This application is a continuation of U.S. patent application Ser. No. 18/132,735, filed Apr. 10, 2023, the disclosure of which is hereby incorporated by reference in its entirety.

FIELD

The present disclosure is directed to improvements related to using machine learning to assess product purchases by consumers. More particularly, the present disclosure is directed to platforms and technologies for using machine learning techniques to determine digital offers for products based on assessing characteristics of product purchases by consumers.

BACKGROUND

Consumers occasionally and/or recurrently purchase various products, such as those offered by Consumer Packaged Goods (CPG) companies, for a variety of reasons. For example, certain consumers often become accustomed to using a particular brand or product and continue to purchase it out of habit, even if there are other options available. This can be particularly true for products that are purchased frequently, such as food or personal care items, where consumers may not want to spend time and effort exploring other options. Further, certain consumers may purchase products that are readily available in stores or online, and that meet their needs without requiring much effort. Marketing and advertising can play a role in encouraging repeat purchases, where certain companies often invest heavily in advertising to build brand awareness and loyalty, which may involve celebrity endorsements, social media campaigns, and product placement in popular TV shows or movies. Moreover, certain consumers may continue to purchase products from a particular brand or company because they perceive them to be of high quality, reliable, and/or affordable, where this may be particularly true for products that are perceived as essential.

However, challenges exist in a company's ability to determine which consumers are purchasing which products. In particular, companies often lack direct access to consumer data if they sell their products through retail channels, as retailers generally have ownership of sales data and do not always share detailed information about individual purchases. Further, companies have limited visibility into consumers' purchase behavior as consumers often purchase products from a variety of retailers and may use different payment methods, thus making it difficult to track purchases. Additionally, companies often sell products that are used by different individuals within a household, however it can be challenging to identify the specific individual who purchased the product and determine their demographics or behavior, as well as to understand the specific needs and preferences of each individual. Therefore, it is challenging for companies to build marketing campaigns that appeal to existing and new consumers alike. Further, consumers are often subject to marketing efforts that do not accurately reflect the types of products that the consumers have purchased or are looking to purchase.

Accordingly, there is an opportunity for platforms and technologies to efficiently and effectively assess data that is useful in developing marketing campaigns.

SUMMARY

In an embodiment, a computer-implemented method of using machine learning to generate digital offers for products is provided. The computer-implemented method may include: training, by at least one processor, a machine learning model using a set of training data identifying (i) an initial set of products purchased by a set of individuals, (ii) a subsequent set of products purchased by at least a portion of the set of individuals after purchase of the initial set of products, and (iii) a set of offers associated with purchase of the subsequent set of products by the at least the portion of the set of individuals; accessing, by at least one processor, a set of data identifying at least one product purchased by an individual, wherein the at least one product is associated with an entity; analyzing, by the at least one processor, the set of data using the machine learning model to determine a digital offer for an additional product associated with the entity or an additional entity; and availing, by the at least one processor, the digital offer for review by the individual via an electronic device.

In another embodiment, a system for using machine learning to generate digital offers for products is provided. The system may include a memory storing a set of computer-readable instructions and data associated with a machine learning model; and one or more processors interfaced with the memory, and configured to execute the set of computer-readable instructions to cause the one or more processors to: train the machine learning model using a set of training data identifying (i) an initial set of products purchased by a set of individuals, (ii) a subsequent set of products purchased by at least a portion of the set of individuals after purchase of the initial set of products, and (iii) a set of offers associated with purchase of the subsequent set of products by the at least the portion of the set of individuals, access a set of data identifying at least one product purchased by an individual, wherein the at least one product is associated with an entity, analyze the set of data using the machine learning model to determine a digital offer for an additional product associated with the entity or an additional entity, and avail the digital offer for review by the individual via an electronic device.

Further, in an embodiment, a non-transitory computer-readable storage medium configured to store instructions executable by one or more processors is provided. The instructions may include: instructions for training a machine learning model using a set of training data identifying (i) an initial set of products purchased by a set of individuals, (ii) a subsequent set of products purchased by at least a portion of the set of individuals after purchase of the initial set of products, and (iii) a set of offers associated with purchase of the subsequent set of products by the at least the portion of the set of individuals; instructions for accessing a set of data identifying at least one product purchased by an individual, wherein the at least one product is associated with an entity; instructions for analyzing the set of data using the machine learning model to determine a digital offer for an additional product associated with the entity or an additional entity; and instructions for availing the digital offer for review by the individual via an electronic device.

DETAILED DESCRIPTION

Figure 1A:
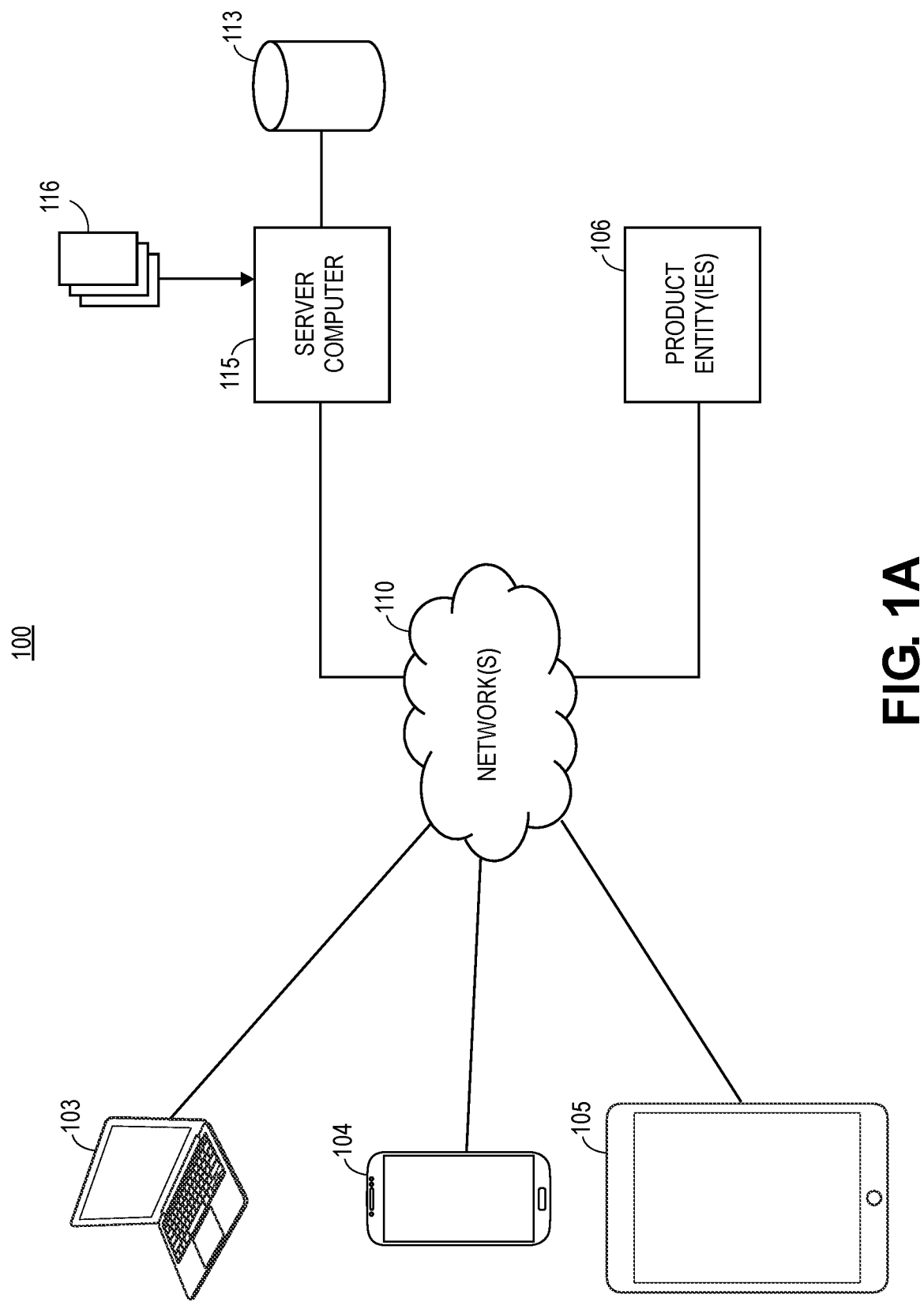
FIG. 1A depicts an overview of components and entities associated with the systems and methods, in accordance with some embodiments.

The present embodiments may relate to, inter alia, using machine learning techniques to assess product purchases by consumers and develop marketing campaigns for products based on the assessment. Generally, marketing campaigns are important to companies for a variety of reasons, such as to build brand awareness, drive sales, target specific audiences, build customer loyalty, and differentiate from competitors, among other reasons. One of the main components of a marketing campaign is sales promotions or offers which may include discounts, rewards (e.g., points), coupons, rebates, free samples, or limited-time offers to incentivize consumers to make a purchase.

It is difficult for companies to accurately devise sales promotions or offers for individual consumers without the companies knowing what products are actually being purchased by the individual consumers. This is especially true for CPG companies, which generally have insight into gross sales figures but do not have much insight into which products are purchased by which individuals, as these products are initially purchased by retailers in bulk and then sold through various retail outlets.

According to embodiments, systems and methods for employing machine learning to assess product purchases by consumers and determine digital product offers for subsequent use are provided. In certain aspects, a machine learning model may be trained using a set of training data that identifies multiple iterations of product purchases as well as any offers associated with the product purchases. Further, the trained machine learning model may be used to analyze a set of data that identifies a set of products purchased by a set of individuals, where the trained machine learning model may output a digital offer(s) for an additional product(s) for potential subsequent purchase by the set of individuals. In embodiments, the systems and methods may avail the digital offer(s) for review by one or more individuals, such as via an application or other type of interface. Additionally, the systems and methods may train and use an additional machine learning model that assesses levels of user affinity to certain brands and products, which may be used by certain entities to develop marketing and/or product promotion campaigns.

The systems and methods represent an improvement to existing technologies, namely data analytics technologies. Some existing conventional technologies are used for data analytics purposes, such as in relation to product marketing. In particular, existing tools can track and measure key performance indicators (KPIs) such as website traffic, click-through rates, and conversion rates, and/or track and measure email open rates, however these tools are usually limited to ecommerce applications and are only detectable on an individual basis. Further, A/B testing tools can compare different versions of a marketing campaign to see which one performs better, however, these tools explicitly require the testing of multiple versions of a campaign which is cumbersome. Additionally, customer relationship management (CRM) software tracks customer interactions and behavior across different channels, such as email, social media, or website visits, however this software is again tied to ecommerce and is generally not applicable to products that are sold through retail channels and/or otherwise associated with CPG companies.

The systems and methods as discussed herein access data indicating which products are purchased by which individuals, for example in response to individuals uploading receipts that indicate the product purchases. The systems and methods assess the product purchase data in association with a product taxonomy or catalog, which enables the systems and methods to assess the affinity that individuals have to certain entities or companies. Additionally, the systems and methods incorporate the training and usage of machine learning models to analyze the affinities of the individuals to determine a set of digital offers that the individuals may want to use to make subsequent product purchases, where the set of digital offers may be availed for review and use by the individuals. The systems and methods, thus, result in a reduced amount of computing usage and network traffic, as usage of the machine learning model results in more tailored digital offers that are more relevant to what the individuals may want to purchase.

The use of the machine learning model represents an improvement to existing technologies because the models ensure accurate, automatic, and efficient determination of digital offers. The training and use of the machine learning model enables the systems and methods to process large datasets that the existing systems are unable to analyze as a whole, resulting in improved processing time by the systems and methods. Additionally, by virtue of employing the trained machine learning models in its analyses, the systems and methods reduce the overall amount of data retrieval and communication necessary for the analyses of information associated with traditional product analytics, thereby reducing traffic bandwidth and resulting in cost savings. The trained machine learning models can also eliminate any amount of time that individuals may spend on assessing and/or developing product offers. Further, the systems and methods are configured to determine when certain individuals use or redeem certain of the rewards. This data is used to update the machine learning model, which results in more accurate offer determinations in subsequent analyses.

Although the present embodiments are described with respect to the purchase of products by individuals, it should be appreciated that the systems and methods additionally or alternatively contemplate the functionalities being applied to the purchase of services by individuals. Generally, a product is a tangible item that an individual can purchase, own, and/or use, where the product is typically produced and sold by manufacturers or retailers and can be physically possessed. A service, on the other hand, is an intangible offering provided by a service provider to fulfill an individual's specific need or solve a problem, where is service is usually consumed at the point of delivery and cannot be owned or possessed.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, products, and/or services (generally, as used herein, "products") that may be offered for sale by an entity. In an embodiment, the entity may be a corporation, company, partnership, retailer, wholesaler operating on behalf of another entity (e.g., a white label wholesaler), or the like, where the entity may offer an ecommerce platform (e.g., a website accessible by or an application executable by the electronic devices 103, 104, 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a server computer 115 via one or more networks 110. The server computer 115 may be associated with an entity (e.g., a corporation, company, partnership, or the like) that may manage and facilitate digital rewards and/or offers for users, such as the set of users associated with the electronic devices 103, 104, 105. In particular, the server computer 115 may include or support a web server configured to host a website which with the electronic devices 103, 104, 105 may interface, such as to communicate indications of the purchase of any products, goods, and/or services, to receive reviews for the products, goods, and/or services, and/or to present a set of digital offers related to a set of products. For instance, a set of users of the set of electronic devices 103, 104, 105 may capture one or more digital images (e.g., using an image sensor of the electronic devices 103, 104, 105) of a receipt(s) indicating a set of products that were purchased by the users, either within a brick and mortar store or via an ecommerce platform, or another purchasing channel.

Further, the server computer 115 may support a software application executable by the set of electronic devices 103, 104, 105 (i.e., the set of electronic devices 103, 104, 105 may interface with the server compute 115 in executing the software application), where the user may use the software application to communicate information indicative of product purchases and review digital offers for products. Additionally, the users of the electronic devices 103, 104, 105 may have an account with a service or application offered by the server computer 115. In embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

The server computer 115 may be configured to interface with or support a memory or storage 113 capable of storing various data, such as in one or more databases or other forms of storage. According to embodiments, the storage 113 may store data or information associated with any products or services that are offered for sale by an entity, including any purchase history(ies) of a set of users, any reviews of products/services provided by users, and/or other data.

The server computer 115 may communicate with one or more product entities 106 via the network(s) 110. In embodiments, the product entity(ies) 106 may be any company involved in the development, manufacture, distribution, and/or sales of one or more products. For example, the product entity(ies) 106 may be a CPG company, private label brand company, direct-to-consumer (DTC) company, e-commerce marketplace provider, local/specialty retailer, and/or the like. Generally, each of the product entity(ies) 106 may be interested in marketing campaigns for its products, such as to raise brand awareness, differentiate its products from competitors, generate sales, build customer loyalty, and introduce new products, among other reasons.

According to embodiments, each of the product entity(ies) 106 may look to offer a set of digital offers to individuals (e.g., the users of the electronic devices 103, 104, 105). For example, a digital offer may be associated with a discount (percentage discount or monetary discount), free sample, bundle, cashback offer, subscription service, referral program, contest or sweepstakes, gift card, loyalty points, exclusive content, real life or virtual experience, and/or the like. Generally, each of the product entity(ies) 106 may want to develop a digital offer strategy for its products, such as to increase sales, attract new consumers, retain existing consumers, and launch a new product, among other purposes.

According to embodiments, the server computer 115 may compile data associated with product sales, as well as use machine learning techniques to determine or develop marketing strategies that may include digital offers for products. The server computer 115 may generate or otherwise access set(s) of training data 116 that the server computer 115 may use to train one or more machine learning models. The server computer 115 may store data associated with training the machine learning model(s) and with the trained machine learning model(s) in the storage 113. Further, the server computer 115 may store, in the storage 113, user affinity data indicative of the purchase histories of a set of users, as well as a product catalog(s) associated with the product entity(ies) 106. The server computer 115 may employ the user affinity data to train and use a machine learning model, the output of which may be availed to the product entity(ies) 106 for purposes of developing marketing or promotional campaigns.

The set of electronic devices 103, 104, 105 may provide, to the server computer 115, data indicating a set of products purchased by the set of individuals associated with the set of electronic devices 103, 104, 105. The server computer 115 may input this data into a trained machine learning model, which may be configured to output a set of digital offers that may entice the set of individuals to make additional product purchases. The set of electronic devices 103, 104, 105 may access and display the set of digital offers for review and/or use by the set of individuals. Data indicating whether subsequent product purchases were made may be accessed by the server computer 115, and the server computer 115 may assess which of the digital offers were redeemed by which of the individuals associated with the set of electronic devices 103, 104, 105.

Although depicted as a single server computer 115 in FIG. 1A, it should be appreciated that the server computer 115 may be in the form of a distributed cluster of computers, servers, machines, cloud-based services, or the like. In this implementation, the entity may utilize the distributed server computer(s) 115 as part of an on-demand cloud computing platform. Accordingly, when the electronic devices 103, 104, 105 interface with the server computer 115, the electronic devices 103, 104, 105 may actually interface with one or more of a number of distributed computers, servers, machines, or the like, to facilitate the described functionalities.

Figure 1B:
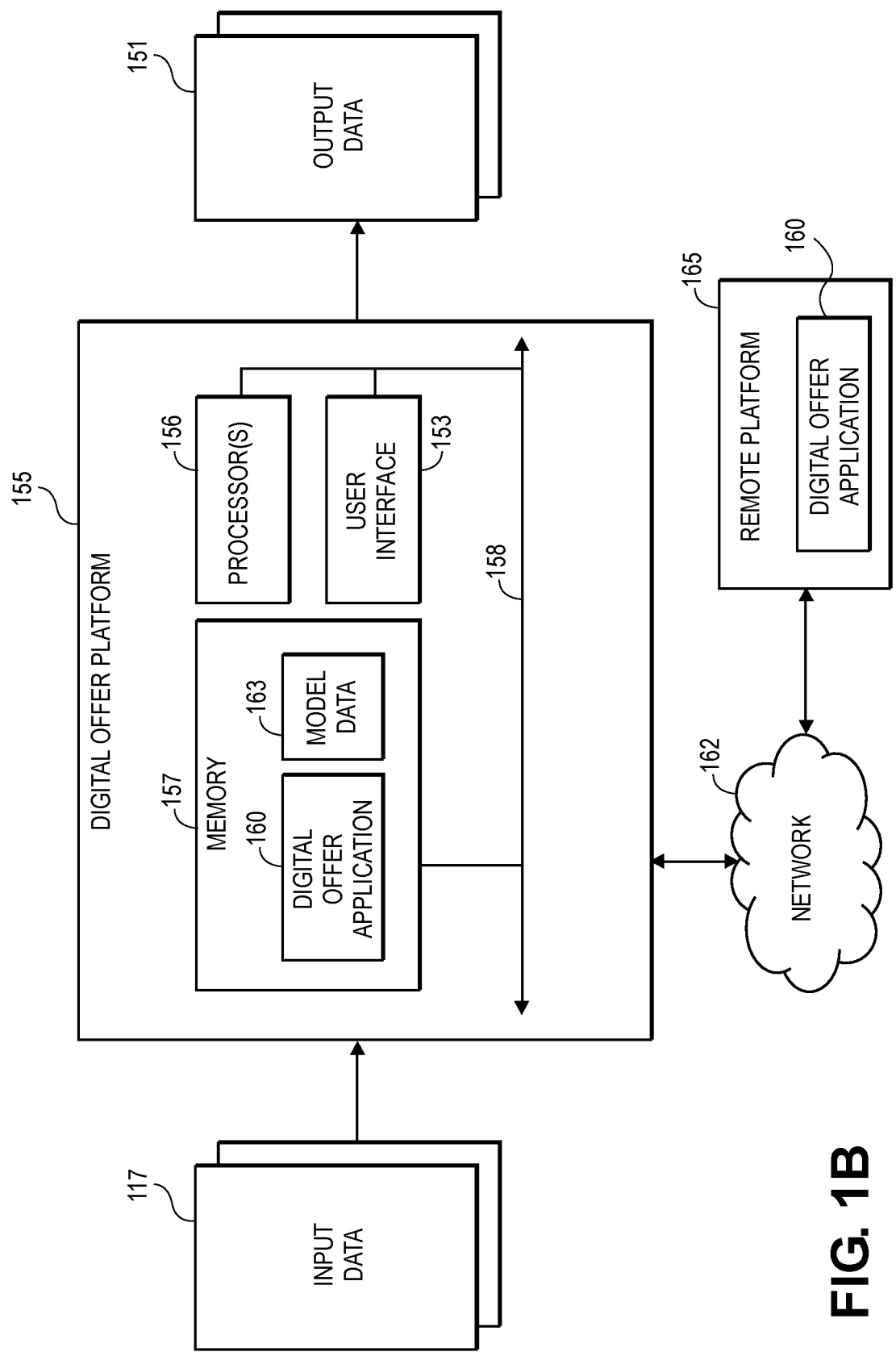
FIG. 1B depicts an overview of certain components configured to facilitate the systems and methods, in accordance with some embodiments.

Further, although three (3) electronic devices 103, 104, 105, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which input data 117 is processed into output data 151 via a digital offer platform 155, according to embodiments. The digital offer platform 155 may be implemented on any computing device or combination of computing devices, including the server computer 115 and/or any of the electronic devices 103, 104, 105, as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The digital offer platform 155 may further include a user interface 153 configured to present content (e.g., input data, output data, digital offer data, and/or other information). Additionally, a user may review results of a digital offer determination and make selections to the presented content via the user interface 153, such as to review output data presented thereon, make selections, and/or perform other interactions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a digital offer application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The digital offer platform 155 may operate in a networked environment and communicate with one or more remote platforms, such as a remote platform 165, via a network(s) 162, such as a local area network (LAN), a wide area network (WAN), or other suitable network. The platform 165 may be implemented on any computing device, including any of the set of electronic devices 103, 104, 105 as discussed with respect to FIG. 1A, and may include many or all of the elements described above with respect to the platform 155. In some embodiments, the digital offer application 160 as will be further described herein may be stored and executed by the remote platform 165 instead of by or in addition to the platform 155.

Generally, each of the input data 117 and the output data 152 may be embodied as any type of electronic document, file, template, etc., that may include various graphical/visual and/or textual content, and may be stored in memory as program data in a hard disk drive, magnetic disk and/or optical disk drive in the digital offer platform 155 and/or the remote platform 165. The digital offer platform 155 may support one or more techniques, algorithms, or the like for analyzing the input data 117 to generate the output data 151. In particular, the digital offer application 160 may access various product purchase data to train and use a set of machine learning models. The memory 157 may store the output data 151 and other data that the digital offer platform 155 generates or uses in associated with the analysis of the input data 117.

According to embodiments, the digital offer application 160 may various employ machine learning and artificial intelligence techniques such as, for example, statistical modeling, inference, supervised or unsupervised learning, a regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like. When the input data 117 is a training dataset, the digital offer application 160 may analyze/process the input data 117 to generate and/or train a machine learning model(s) for storage as part of model data 163 that may be stored in the memory 157. In embodiments, various of the output data 151 may be added to the machine learning model(s) stored as part of the model data 163. In analyzing or processing the input data 117, the digital offer application 160 may use any of the output data 151 previously generated by the digital offer platform 155.

The digital offer application 160 (or another component) may cause the output data 151 (and, in some cases, the training or input data 117) to be displayed on the user interface 153 for review by the user of the digital offer platform 155. Additionally, the digital offer application 160 may analyze or examine the output data 151 to assess any generated digital offers, which may be displayed on the user interface 153 as part of a dashboard, interface, or the like. The user may select to review and/or modify the displayed data. For instance, the user may review the output data 151 to assess opportunities for developing and/or improving marketing campaigns.

Figure 2:
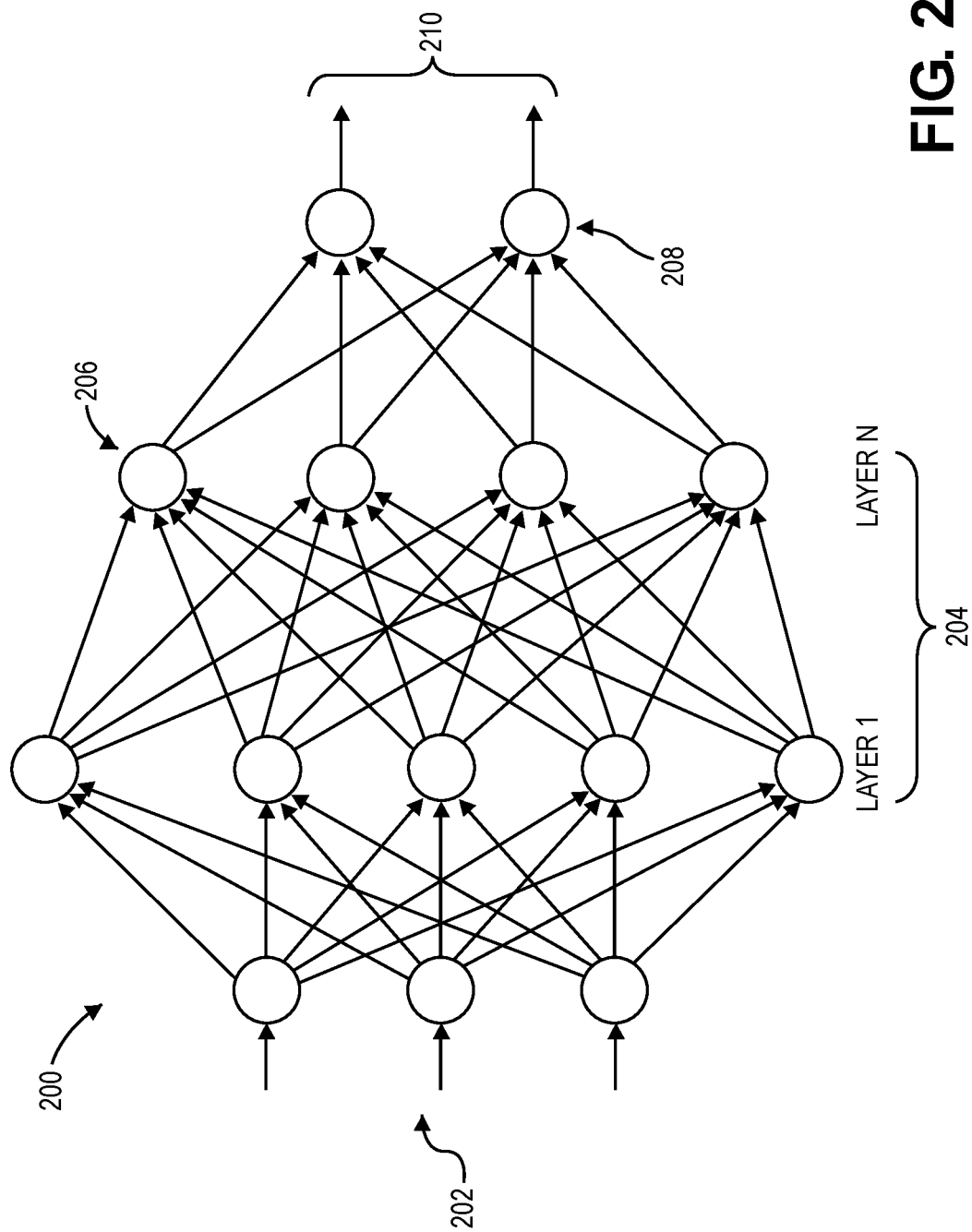
FIG. 2 depicts an exemplary deep learning artificial neural network (DNN) that may be employed by the systems and methods, in accordance with some embodiments.

FIG. 2 depicts an exemplary deep learning artificial neural network (DNN) 200, which may be used in conjunction with the machine learning techniques as discussed herein. The DNN 200 may be trained and/or operated by the product taxonomy analysis platform 155 of FIG. 1B, for example. The DNN 200 may include a plurality of layers, each of which include any number of respective neurons, or nodes.

The DNN 200 may include an input layer 202, one or more hidden layers 204, and an output layer 208. Each of the layers in the DNN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of DNNs are possible.

The input layer 202 may correspond to a large number of input parameters (e.g., one million inputs), in some embodiments, and may be analyzed serially or in parallel. Further, various neurons and/or neuron connections within the DNN may be initialized with any number of weights and/or other training parameters. Each of the neurons in the hidden layers 204 may analyze one or more of the input parameters from the input layer 202, and/or one or more outputs from a previous one or more of the hidden layers 204, to generate a decision 210 or other output. The output layer 208 may generate the decision 210 or more outputs, each indicating a prediction or an expected value. The number of input neurons may be stored as a predetermined value, and used to initialize a network for training.

In some embodiments and/or scenarios, the output layer 208 may include only a single output 210. For example, a neuron may correspond to one of the neurons in a hidden layer 206. Each of the inputs to the neuron may be weighted according to a set of weights W1 through Wi, determined during the training process (for example, if the neural network is a recurrent neural network) and then applied to a node that performs an operation α. The operation α may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 210 of the DNN. In some embodiments, the DNN may include one or more convolutional neural network (CNN) layers.

Figure 3:
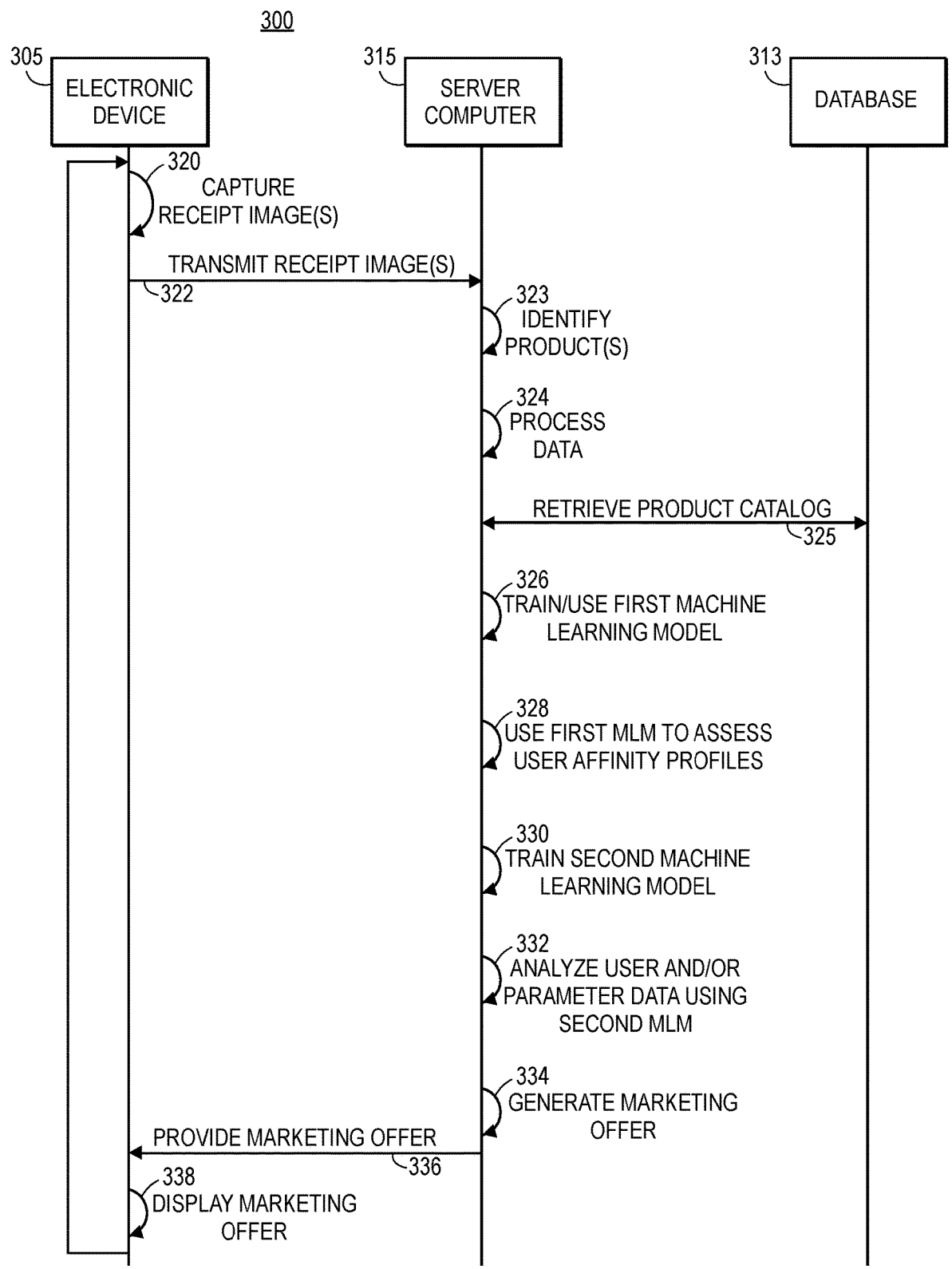
FIG. 3 depicts an example signal diagram detailing the functionalities of the systems and methods, in accordance with some embodiments.

FIG. 3 depicts a signal diagram 300 of various functionalities associated with the described embodiments. The signal diagram 300 may include an electronic device 305 (such as one of the electronic devices 103, 104, 105 as described with respect to FIG. 1A), a server computer 315 (such as the server computer 115 as described with respect to FIG. 1A), and a database 313 (such as the storage 113 as described with respect to FIG. 1A). Although a single electronic device is depicted in and described with respect to FIG. 3, it should be appreciated that multiple electronic devices that may each interface with the server computer 315 are envisioned. Further, it should be appreciated that the functionalities of the signal diagram 300 may be performed in an order(s) alternative to what is depicted in FIG. 3.

The signal diagram 300 may begin at 320 when the electronic device 305 captures a set of images of a set of receipts. In an embodiment, a user of the electronic device 305 may capture one or more digital images (e.g., using an image sensor of the electronic device 305) of a receipt(s) indicating a set of products that were purchased by the user, either within a brick and mortar store or via an ecommerce platform, or another purchasing channel. The receipt(s) may be a physical printed receipt or may be a digital receipt that may be displayed by the electronic device 305 (where the electronic device may capture the digital receipt via, for example, a screenshot).

The electronic device 305 may transmit (322) the receipt image(s) to the server computer 315, such as via a network connection. In another embodiment, the server computer 315 may interface with another device, such as a third party server, that stores data identifying a purchase history of a user(s) associated with the electronic device 305. For example, the third party server may be associated with an ecommerce platform or site that offers various products for purchase. For further example, the third party server may be an e-mail provider that receives and stores (e.g., in a user inbox) order confirmations indicating a purchase(s) made by a user(s) of the e-mail provider.

The server computer 315 may identify (323) a set of products that was purchased, such as from the receipt image(s) that was transmitted in (322) and/or from a third party server that supplies data identifying a set of purchased products. The server computer 315 may identify the set of products that was purchased from one or more identifiers, such as a barcode, UPC, ISBN, GTIN, EAN, or other identification, where the identifier(s) may be included on an image of a receipt or on a confirmation of a purchase of a product(s). In embodiments, the server computer 315 may perform one or more image recognition techniques on any receipt image(s) received from the electronic device 305, to identify a set of products that is identified on the receipt image(s).

In this regard, the server computer 315 may have access to the purchase history (i.e., as identified on the receipt image(s) or from a third party server), analyze the purchase history, and identify any product(s) included in the purchase history and therefore purchased by the user. It should be appreciated that one or more of the products that may be identified from a given user's purchase history, e-mail, digital image, or the like may not have been physically or actually purchased by the given user, however by virtue of the one or more products being associated with the given user's purchase, history, e-mail, digital image, or the like, the server computer 315 may deem that the one or more products was purchased by the given user. In embodiments, the server computer 315 may apply, to an account of the given user, a set of rewards associated with the purchased product(s). For example, each purchased product may have an amount of points (or other reward metric) that is applied to the account of the given user.

The server computer 315 may process (324) any resulting data. In embodiments, the server computer 315 may clean, filter, and/or aggregate any data that indicates the set of products that was purchased, as well as any data that identifies the user who purchased the set of products. It should be appreciated that the data that is processed may include data identifying any additional users as well as any products purchased by the additional users.

The server computer 315 may retrieve (325) a product catalog from the database 313. According to embodiments, the product catalog may represent a hierarchy or taxonomy of products which may be organized by attributes or characteristics of the products. Generally, the product catalog may define categories for products in a way that is mutually exclusive and cumulatively exhaustive. For example, a bag of BBQ potato chips may be categorized in the following order, where each category may be a specified level in the product catalog: foods, snacks, potato chips, BBQ. It should be appreciated that the product catalog may be stored as one or more data structures, such as a tree-like structure in which each product category may be represented by a node in the tree, and the relationships between categories may be represented by the parent-child relationships between nodes. Other data structures are envisioned, such as graphs, tables, and/or the like. It should be appreciated that there may be multiple product catalogs, each of which may be associated with a given entity having a set of products in the marketplace.

The server computer 315 may train or use (326) (or in some cases update) a first machine learning model. According to embodiments, the server computer 315 may access or obtain a set of training data that may identify (i) a set of products purchased by a set of individuals, (ii) a training product catalog, and (ii) a categorization of the purchased set of products within the training product catalog. In embodiments, the training product catalog may be the same as the product catalog retrieved in (325). Generally, the first machine learning model may enable insight into purchase histories of individuals in association with product categories for a given entity.

The server computer 315 may assess (328) user affinity profiles of a set of users, which may include the user associated with the electronic device 305 as well as any additional users. In particular, the server computer 315 may input, into the first machine learning model, data associated with the product(s) identified in (323) and the product catalog retrieved in (325), as well as any additional data indicating product purchases by a set of users and any applicable product catalogs. The first machine learning model may output a set of user affinity profiles, each of which may describe or indicate characteristics associated with a purchase history of the respective user, including a listing of what and how many product(s) that user has purchased, the cost of each purchased product(s), as well as when the user purchased the product(s). In embodiments, each user affinity profile may align with an applicable product catalog by indicating which purchased products correspond to which labels or categories included in the product catalog. It should be appreciated that the user affinity profiles may be organized in other manners.

The server computer 315 may avail the user affinity profiles, such as for access by a partner entity such as a CPG company or another entity. According to embodiments, the partner entity may access the user affinity profiles to review and assess which products, of the products offered by the partner entity and/or other entities, a set of users has purchased, the timing of the purchases, and the total spend by the user(s), including the spend and purchase timing broken down on a product-by-product basis and/or on a category (or subcategory) basis.

According to embodiments, the user affinity profile(s) may enable a given partner entity to strategically plan for product launches and develop marketing campaigns, as well as ideate on new product developments and/or existing product updates. Additionally, the user affinity profile(s) may enable the given partner entity to identify a segment of users that meets a given budget requirement for a given product category over a given period of time, and/or that meets any specified goal(s) of a marketing campaign. It should be appreciated that alternative and additional determinations may be made by the given partner entity from the set of user affinity profiles. In embodiments, the given partner entity may specify parameters for a marketing or offer campaign, including identifying a set of products that may be eligible for offers, a type of the offers (e.g., a discount, reward points, etc.), any applicable expiration for the offers, and/or other parameters.

It should be appreciated that the first machine learning model may be updated with additional data. In particular, the first machine learning model may be updated with indications of subsequent product purchases by a set of users, changes to any product catalogs, and/or other data, such that subsequent user affinity profile assessments by the server computer 315 may use the updated first machine learning model for more accurate or refined outputs. It should be appreciated that the database 313 may store data associated with the first machine learning model.

The server computer 315 may additionally train (330) a second machine learning model. According to embodiments, the server computer 315 may access or obtain a set of training data that may identify (i) an initial set of products purchased by a set of individuals, (ii) a subsequent set of products purchased by at least a portion of the set of individuals after purchase of the initial set of products, and (iii) a set of offers associated with purchase of the subsequent set of products purchased by the at least the portion of the set of individuals. The set of training data may further indicate any hierarchy or taxonomy characteristics of the identified products. Accordingly, the set of training data may indicate the purchase habits of the set of individuals and, by virtue of the subsequent set of products purchased by at least a portion of the set of individuals, may indicate which of the set of offers may have influenced or enticed which of the set of individuals to purchase at least a portion of the subsequent set of products. After the server computer 315 initially trains the second machine learning model, the server computer 315 may use the trained second machine learning model for subsequent analyses. Further, the server computer 315 may update the second machine learning model using new data. It should be appreciated that the database 313 may store data associated with the second machine learning model.

In embodiments, the set of offers that is used to train the second machine learning model may be for the same product(s) as included in the initial set of products, may be for products that are different from the initial set of products (where these different products may or may not compete in the marketplace with the initial set of products), and/or may be for products from the same entity (e.g., a CPG company) that develops/markets the initial set of products. Further, in embodiments, the set of offers may be for product(s) that at least partially overlap with the subsequent set of products (i.e., the at least the portion of the set of individuals purchases the subsequent set of products with or without redeeming the set of offers, and for products that match or do not match the products specified in the set of offers).

For example, the set of training data may indicate that Individual A purchased $100 worth of Product A on four (4) separate occasions over thirty (30) days, that Individual B purchased $30 worth of Product A on one (1) occasion over thirty (30) days, and that Individual C purchased $200 worth of Product A on twenty (20) separate occasions over thirty (30) days. Further, the set of training data may indicate a set of offers that was provided to Individuals A, B, and C: a first offer, provided to each of Individuals A and B, that specified $5 off the purchase of Product A and that was valid for seven (7) days; a second offer, provided to Individual C, that specified $1 off the purchase of Product A and that was valid for seven (7) days; a third offer, also provided to Individual C, that specified $1 off the purchase of Product B (which is a product that competes with Product A) and that was valid for seven (7) days; and a fourth offer, also provided to Individual C, that specified $5 off the purchase of Product C (which is a product from the same CPG manufacturer as that of Product A).

Additionally, in this example, the set of training data may indicate a subsequent set of purchased products after the offers were respectively provided to Individuals A, B, and C, namely that: Individual A did not redeem the first offer for $5 off the purchase of Product A, Individual B did redeem the first offer for $5 off the purchase of Product A, Individual C did redeem the second offer for $1 off the purchase of Product A, Individual C did not redeem the third offer for $1 off the purchase of Product B, and Individual C did redeem the fourth offer for $5 off the purchase of Product C. These subsequent purchase may indicate that, ostensibly, the first offer was sufficient to entice Individual B to purchase Product A but not sufficient to entice Individual A to purchase Product A. Further, ostensibly, the second offer was sufficient to entice Individual C to purchase Product A (but perhaps Individual C would have purchased Product A regardless); the third offer was not sufficient to entice Individual C to purchase Product B due to a preference to Product A; and the fourth offer was sufficient to entice Individual C to purchase Product C due to loyalty to the CPG associated with Product A.

The server computer 315 may analyze (332) user and/or parameter data using the second machine learning model to determine a marketing or offer campaign for a set of products associated with a partner entity. According to embodiments, the user data may be any data associated with a user affinity profile for a given user and/or data indicative of a set of products purchased by the given user, and the parameter data may be any data that is specified by the partner entity for a marketing or offer campaign. It should be appreciated that the server computer 315 may analyze multiple user affinity profiles (i.e., the user affinity profile of the user associated with the electronic device 305 as well as any other stored user affinity profiles) and/or other user data to determine the marketing or offer campaign. In determining the marketing or offer campaign, the server computer 315 may account for any parameters specified by the partner entity. For example, the server computer 315 may determine an offer for Product A if the partner entity specifies that it wants Product A to be eligible for offers.

According to embodiments, the general goal of the marketing or offer campaign is to entice users to spend more money on (or otherwise buy, such as without previously purchasing) one or more products associated with a given partner entity. The campaign may therefore include a set of digital offers for a set of products, where the set of digital offers may offer a monetary or percentage discount for a given product, a free product, a product promotion (e.g., buy one get one free), or another type of digital offer. In embodiments, the set of digital offers may be for a type of product(s) that a given user has already purchased, a product(s) that competes with a product that the given user has already purchased, a product(s) offered by a given entity that also sells a product that the given user has already purchased, or another product that the machine learning model determines that the given user may be enticed to purchase.

The server computer 315 may generate (334) a marketing offer for the user of the electronic device 305 based on the output of the analysis by the second machine learning model, where the marketing offer may include one or more digital offers for a set of products. In embodiments, the one or more digital offers may be specifically tailored to the user of the electronic device 305, where the server computer 315 may generate additional marketing offers that may be specifically and respectively tailored to a set of additional users.

The server computer 315 may provide (336) the marketing offer to the electronic device 305, and the electronic device 305 may display (338) or otherwise avail the marketing offer for access/review by the user of the electronic device 305. In embodiments, the server computer 315 may avail the marketing offer in an account of the user of the electronic device 305, where the user may use the electronic device 305 to access the marketing offer via an account login, website, application, or other access technique. For example, the server computer 315 may send a text message including a URL to the electronic device 305, where the user may select the URL which causes the electronic device 305 to navigate to a website that displays the marketing offer and details thereof (which may or may not require the user to log in to an account). It should be appreciated that other communication and display techniques and channels are envisioned.

At this point, the user may or may not redeem one or more of the digital offer(s) that is included in the marketing offer (i.e., the user may purchase a product(s) that is identified in the one or more of the digital offer(s)). Accordingly, the processing of the signal diagram 300 may repeat to account for any subsequent purchase(s) by the user of the electronic device 305 as well as any additional users, as well as account for any purchase(s) that was not made by the user in association with the marketing offer.

An additional feature of the product identification functionality (323) as discussed herein involves determining whether a given digital offer has been redeemed. In particular, the server computer 315 may maintain a listing of any digital offers that are available, as well as any applicable expiration dates for the digital offer(s). The electronic device 305 may facilitate functionalities 320 and 322 as discussed herein, and the server computer 315 may additionally identify (323) any purchased product(s) as discussed herein. The server computer 315 may compare the purchased product(s) identified in (323) to product(s) included in the listing of available digital offers and, based on the comparison, determine whether the user of the electronic device 305 "redeemed" any of the available digital offers for the product(s) by virtue of purchasing the product(s).

The server computer 315 may additionally update the first and/or second machine learning models based on this comparison. In particular, the server computer 315 may update the first and/or second machine learning models with data reflecting which of the digital offers resulted in a redemption/product purchase, as well as which of the digital offers did not result in a redemption/product purchase. Accordingly, the server computer 315 may update, assess, and/or avail the user affinity profile(s) based on any updated product purchase data, which may be used by a partner entity(ies) to revise and develop a marketing or promotion campaign(s). Further, the server computer 315 may use at least the updated second machine learning model to determine more accurate, effective, and/or tailored marketing offers to provide to users, among other benefits.

Figure 4B:
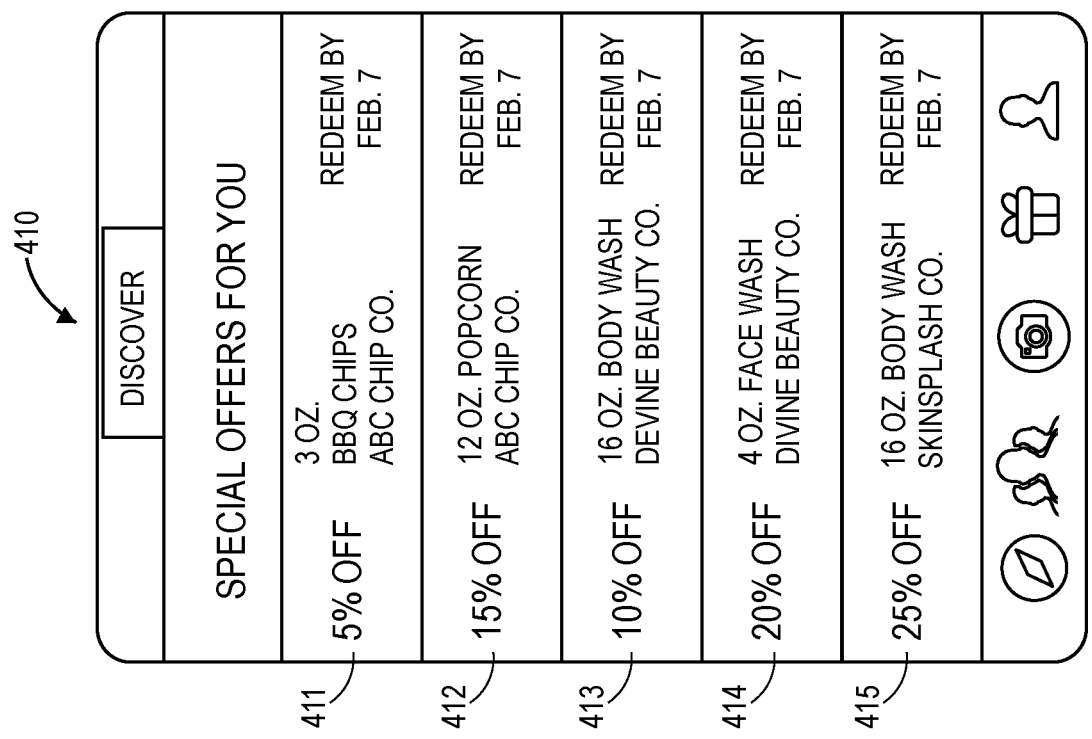
FIGS. 4A and 4B are example interfaces illustrating various features of the systems and methods, in accordance with some embodiments.
Figure 4A:
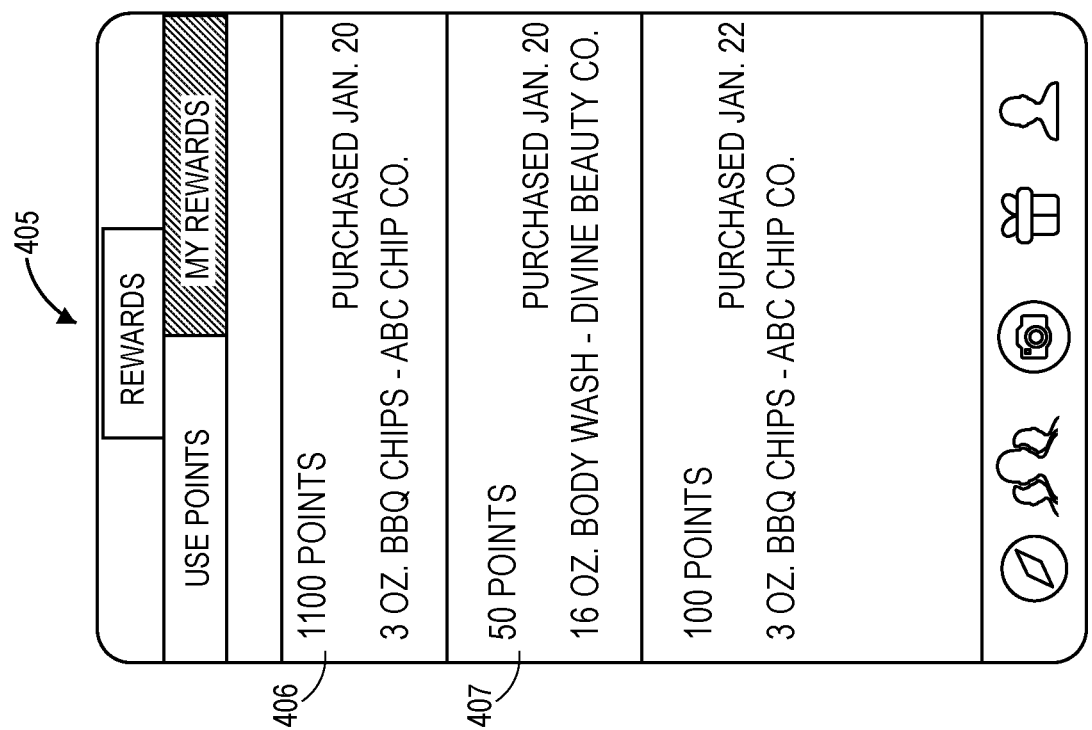

FIGS. 4A and 4B illustrate example interfaces that may be displayed on a user interface of an electronic device (such as the electronic device 305 as discussed with respect to FIG. 3). In embodiments, the interfaces may be associated with an application executable by, or a website accessed by, the electronic device (as generally used herein, an "application"). Further, the interfaces may be specific to a user of the electronic device, where the user may access the interfaces by logging into an account or via another type of access. It should be appreciated that the content of the interfaces is exemplary, and that alternative or additional content is envisioned.

FIG. 4A illustrates an interface 405 that identifies a set of rewards earned by the user. In particular, the set of rewards corresponds to a set of products that the application has designated as purchased by the user (e.g., via the user uploading a receipt(s) of the set of products). Accordingly, the application may determine a reward (e.g., a point value) for each of the set of products. For example, a reward 406 of one hundred (100) points is applied to the account of the user in association with the purchase of a 3 oz. bag of BBQ chips from ABC Chip Co., and a reward 407 of fifty (50) points is applied to the account of the user in association with the purchase of 16 oz. bottle of body wash from Divine Beauty Co. According to embodiments, data indicative of the set of products purchased by the user may be input into the trained machine learning model, which may output a set of digital offers that may be redeemed by the user purchasing a set of products identified in the set of offers.

FIG. 4B illustrates an interface 410 that identifies the set of digital offers that may be redeemed by the user. For example, a digital offer 411 may specify 5% off a purchase of a 3 oz. bag of BBQ chips from ABC Chip Co., a digital offer 412 may specify 15% off a purchase of a 12 oz. bag of popcorn from ABC Chip Co., a digital offer 413 may specify 10% off a 16 oz. bottle of body wash from Divine Beauty Co., and a digital offer 414 may specify 20% off a 4 oz. bottle of face wash from Divine Beauty Co.

According to embodiments, the set of digital offers may be determined to entice the user to make the specified set of purchases. For example, because the user purchased two (2) bags of BBQ chips and one (1) bottle of body wash (as indicated in the interface 405) (i.e., the user seems to be more inclined to repeatedly purchase the BBQ chips), the 5% off the bag of BBQ chips as specified in the digital offer 411 may be less than the 10% off the bottle of body wash as specified in the digital offer 413. Further, an entity such as a CPG manufacturer may be interested in enticing the user to purchase additional products offered by the entity. For example, the digital offer 412 specifies the 15% discount for a purchase of a bag of popcorn available from the same entity (ABC Chip Co.) as the BBQ chips, and the digital offer 414 specifies the 20% discount for a purchase of a bottle of face wash available from the same entity (Divine Beauty Co.) as the body wash. The interface 410 may further indicate a digital offer 415 that specifies 25% off a purchase of a 16 oz. bottle of body wash from Skinsplash Co. In this regard, the entity (Skinsplash Co.) may want to entice the user (who already purchased a competing 16 oz. bottle of body wash from Divine Beauty Co.) to purchase its own body wash.

According to embodiments, the user may redeem any of the set of digital offers at a point of sale (e.g., where the set of digital offers may specify a discount code, QR code, or the like that may be input at the point of sale). Alternatively, the server computer may determine that the user purchased one or more of the products specified in the set of digital offers according to the functionalities discussed herein, and may apply any specified discounts or amounts to an account of the user. Although the set of digital offers as illustrate in FIG. 4B specify a percentage discount, it should be appreciate that other types of digital offers are envisioned, such as a monetary discount, free sample, bundle, cashback offer, subscription service, referral program, contest or sweepstakes, gift card, loyalty points, exclusive content, real life or virtual experience, and/or the like.

Figure 5:
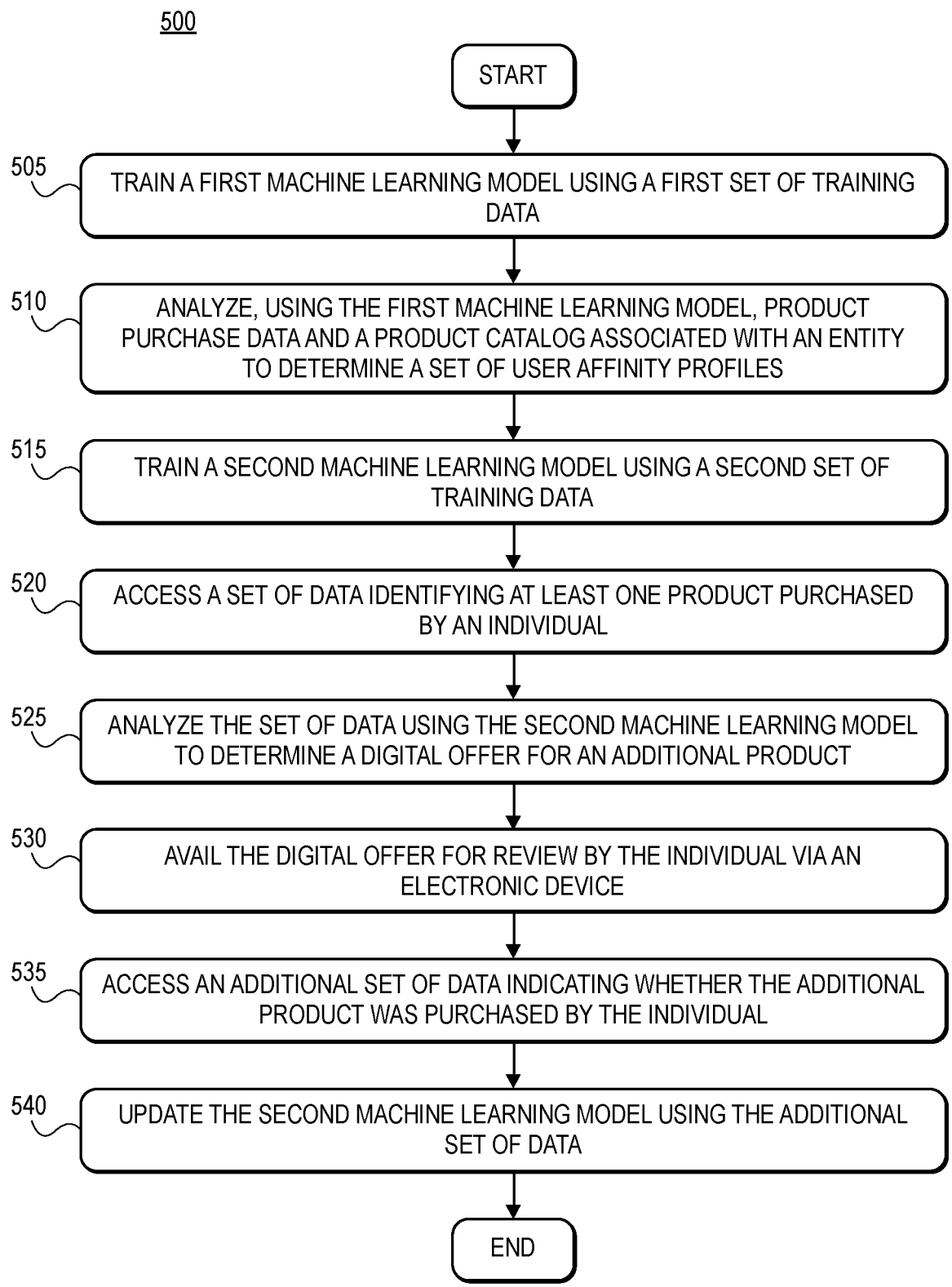
FIG. 5 illustrates an example flow diagram of using machine learning to generate digital offers for products, in accordance with some embodiments.

FIG. 5 is a block diagram of an example method 500 of using machine learning to generate digital offers for products. The method 500 may be facilitated by a server computer(s) (such as the server computer 315 as depicted in FIG. 3) or other type of electronic device.

The method 500 may begin when the server computer(s) trains (block 505) a first machine learning model using a first set of training data. In embodiments, the first set of training data may identify at least (i) a set of product catalogs, and (ii) a categorization of a purchased set of products within the set of product catalogs. Further, the server computer(s) may analyze (block 510), using the first machine learning model, product purchase data and a product catalog associated with an entity to determine a set of user affinity profiles. In embodiments, the server computer(s) may also avail the set of user affinity profiles to an entity for review and assessment by the entity, for example in developing a marketing campaign and assessing whether and how certain users or individuals would respond to the marketing campaign.

The server computer(s) may also train (block 515) a second machine learning model using a second set of training data. In embodiments, the second set of training data may identify (i) an initial set of products purchased by a set of individuals, (ii) a subsequent set of products purchased by at least a portion of the set of individuals after purchase of the initial set of products, and (iii) a set of offers associated with purchase of the subsequent set of products by the at least the portion of the set of individuals.

The server computer(s) may access (block 520) a set of data identifying at least one product purchased by an individual, where the at least one product may be associated with an entity. In embodiments, the server computer(s) may receive a set of digital image data (e.g., depicting a receipt(s)), and analyze the set of digital image data to identify the at least one product purchased by the individual. Alternatively or additionally, the server computer(s) may interface with another server to access a purchase/order history of the individual that includes the at least one product.

The server computer(s) may analyze (block 525) the set of data using the second machine learning model to determine a digital offer for an additional product, wherein the additional product may be associated with the entity or an additional entity. In embodiments, the at least one product purchased by the individual and the additional product may be for the same type, or a different type, of product. Further, in embodiments, the digital offer may be in the form of a monetary discount (e.g., a percentage off or dollar amount reduction), or other type of reward/offer.

The server computer(s) may avail (block 530) the digital offer for review by the individual via an electronic device. In embodiments, the digital offer may be presented via a user interface of the electronic device. The server computer(s) may access (block 535) an additional set of data indicating whether additional product was purchased by the individual. Further, the server computer(s) may update (block 540) the second machine learning model (and optionally the first machine learning model) using the additional set of data.

Figure 6:
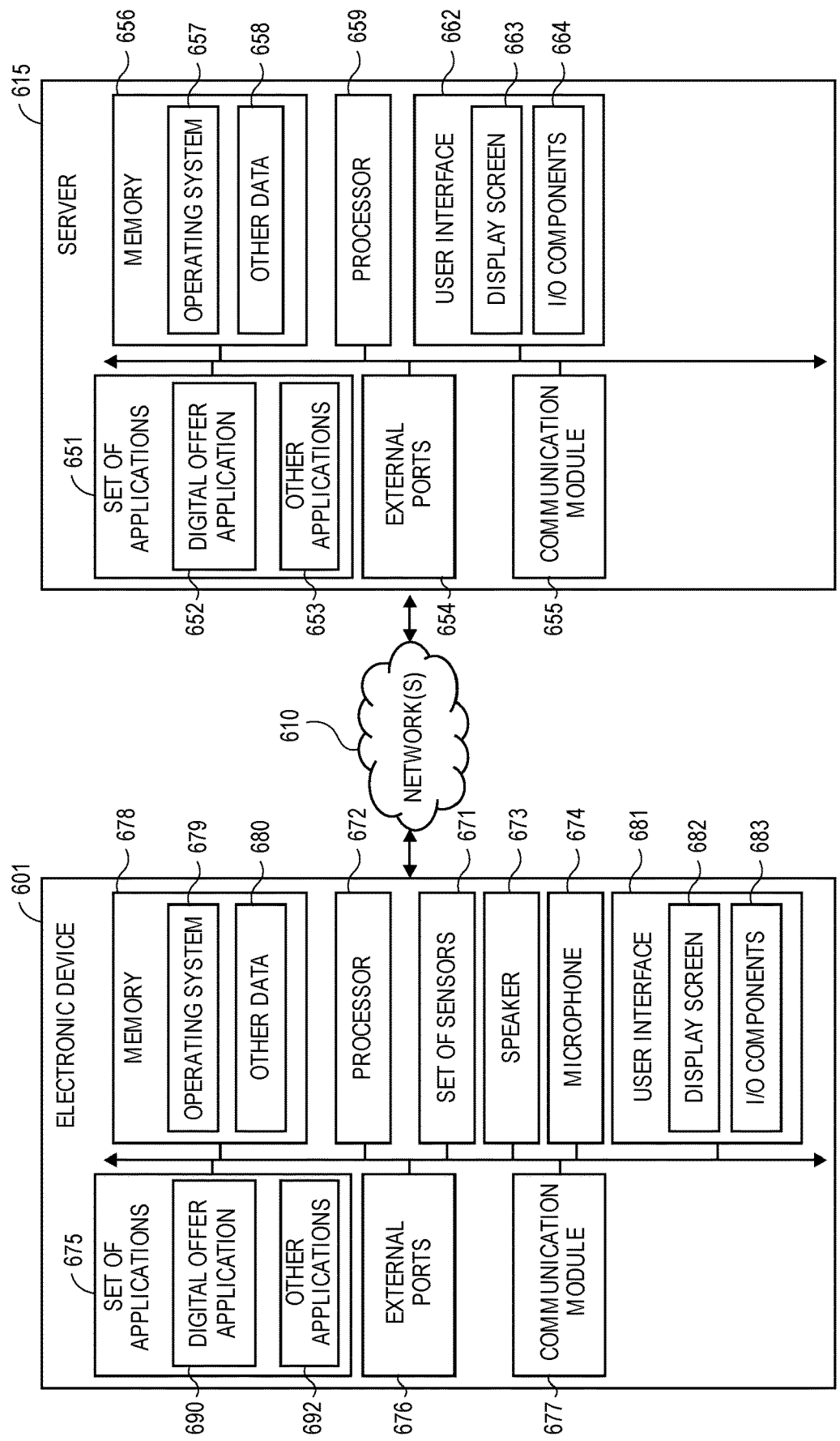
FIG. 6 is an example hardware diagram of an electronic device and a server configured to perform various functionalities, in accordance with some embodiments.

FIG. 6 illustrates a hardware diagram of an example electronic device 601 (e.g., one of the electronic devices 103, 104, 105 as described with respect to FIG. 1A) and an example server 615 (e.g., the server computer 115 as described with respect to FIG. 1A), in which the functionalities as discussed herein may be implemented. It should be appreciated that the components of the electronic device 601 and the server 615 are merely exemplary, and that additional or alternative components and arrangements thereof are envisioned.

The electronic device 601 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a digital offer application 690, such as to access various data, train machine learning models, and analyze data using the machine learning models to determine a set of digital offers associated with a set of products. It should be appreciated that one or more other applications 692 are envisioned.

The processor 672 may interface with the memory 678 to execute the operating system 679 and the set of applications 675. According to some embodiments, the memory 678 may also store other data 680, such as machine learning model data and/or other data, such as product catalog data, that may be used in the analyses and determinations as discussed herein. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 601 may further include a communication module 677 configured to communicate data via one or more networks 610. According to some embodiments, the communication module 677 may include one or more transceivers (e.g., WAN, WWAN, WLAN, and/or WPAN transceivers) functioning in accordance with IEEE standards, 3GPP standards, or other standards, and configured to receive and transmit data via one or more external ports 676.

The electronic device 601 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 601 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, and/or built in or external keyboard). Additionally, the electronic device 601 may include a speaker 673 configured to output audio data and a microphone 674 configured to detect audio.

In some embodiments, the electronic device 601 may perform the functionalities as discussed herein as part of a "cloud" network or may otherwise communicate with other hardware or software components within the cloud to send, retrieve, or otherwise analyze data.

As illustrated in FIG. 6, the electronic device 601 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a digital offer application 652, such as to access various data, train machine learning models, and analyze data using the machine learning models to determine a set of digital offers associated with a set of products. It should be appreciated that one or more other applications 653 are envisioned.

The processor 659 may interface with the memory 656 to execute the operating system 657 and the set of applications 651. According to some embodiments, the memory 656 may also store other data 658, such as machine learning model data and/or other data, such as product catalog data, that may be used in the analyses and determinations as discussed herein. The memory 656 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WAN, WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs, external or built in keyboard). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of training multiple machine learning models, the computer-implemented method comprising:
    training, by at least one processor, a first machine learning model using a first set of training data indicating how a purchased set of products or services is categorized within a set of data structures;
    receiving, by the at least one processor from a plurality of electronic devices associated with a plurality of users, a plurality of digital images captured by the plurality of electronic devices;
    analyzing, by the at least one processor using an image recognition technique, the plurality of digital images to identify, as included in the plurality of digital images, a plurality of identifiers corresponding to a plurality of products or services purchased by the plurality of users;
    analyzing, by the at least one processor using the first machine learning model, (i) data indicating the plurality of products or services purchased by the plurality of users, and (ii) a data structure associated with an entity to determine a plurality of user affinity profiles respectively associated with the plurality of users;
    training, by the at least one processor, a second machine learning model using a second set of training data identifying (i) a training set of products or services purchased by a set of individuals, and (ii) a set of offers provided to the set of individuals in association with the purchase of the training set of products or services by the set of individuals;
    identifying, by the at least one processor from the data indicating the plurality of products or services purchased by the plurality of users, at least one product or service associated with the entity and purchased by a user of the plurality of users;
    analyzing, by the at least one processor using the second machine learning model, data identifying the at least one product or service and a user affinity profile of the plurality of user affinity profiles associated with the user of the plurality of users to determine a digital offer for an additional product or service associated with the entity or an additional entity;
    availing, by the at least one processor, the digital offer for review by the user via an electronic device, of the plurality of electronic devices, associated with the user;
    accessing, by at least one processor from a digital image captured by the electronic device associated with the user, an additional set of data indicating whether the additional product or service was purchased by the user; and
    updating, by the at least one processor, the second machine learning model using the additional set of data to enable more accurate digital offer determinations in subsequent analyses.

2. The computer-implemented method of claim 1, wherein training the first machine learning model comprises:
    training, by at least one processor, the first machine learning model using the first set of training data indicating how the purchased set of products or services is categorized within the set of data structures, wherein the purchased set of products or services is categorized within the set of data structures in a manner that is mutually exclusive and cumulatively exhaustive.

3. The computer-implemented method of claim 1, wherein training the second machine learning model comprises:
    training, by the at least one processor, the second machine learning model using the second set of training data identifying (i) an initial training set of products or services purchased by the set of individuals, (ii) the set of offers provided to the set of individuals after the initial training set of products or services is purchased by the set of individuals, and (iii) a subsequent training set of products or services purchased by at least a portion of the set of individuals after purchase of the initial training set of products or services and after the set of offers is provided to the set of individuals.

4. The computer-implemented method of claim 1, wherein the at least one product or service purchased by the user and the additional product or service are for the same type of product or service.

5. The computer-implemented method of claim 1, wherein analyzing the data identifying the at least one product or service and the user affinity profile comprises:
    analyzing, by the at least one processor using the second machine learning model, the data identifying the at least one product or service and the user affinity profile to determine a discount associated with purchase of the additional product or service.

6. The computer-implemented method of claim 1, further comprising:
    availing the plurality of user affinity profiles to the entity.

7. A system for training multiple machine learning models, comprising:
    a memory storing a set of computer-readable instructions and data associated with a first machine learning model and a second machine learning model; and
    at least one processor interfaced with the memory, and configured to execute the set of computer-readable instructions to cause the at least one processor to:
        train the first machine learning model using a first set of training data indicating how a purchased set of products or services is categorized within a set of data structures,
        receive, from a plurality of electronic devices associated with a plurality of users, a plurality of digital images captured by the plurality of electronic devices,
        analyze, using an image recognition technique, the plurality of digital images to identify, as included in the plurality of digital images, a plurality of identifiers corresponding to a plurality of products or services purchased by the plurality of users,
        analyze, using the first machine learning model, (i) data indicating the plurality of products or services purchased by the plurality of users, and (ii) a data structure associated with an entity to determine a plurality of user affinity profiles respectively associated with the plurality of users,
train the second machine learning model using a second set of training data identifying (i) a training set of products or services purchased by a set of individuals, and (ii) a set of offers provided to the set of individuals in association with the purchase of the training set of products or services by the set of individuals,
identify, from the data indicating the plurality of products or services purchased by the plurality of users, at least one product or service associated with the entity and purchased by a user of the plurality of users,
analyze, using the second machine learning model, data identifying the at least one product or service and a user affinity profile of the plurality of user affinity profiles associated with the user of the plurality of users to determine a digital offer for an additional product or service associated with the entity or an additional entity,
avail the digital offer for review by the user via an electronic device, of the plurality of electronic devices, associated with the user,
access, from a digital image captured by the electronic device associated with the user, an additional set of data indicating whether the additional product or service was purchased by the user, and
update the second machine learning model using the additional set of data to enable more accurate digital offer determinations in subsequent analyses.

8. The system of claim 7, wherein the purchased set of products or services is categorized within the set of data structures in a manner that is mutually exclusive and cumulatively exhaustive.

9. The system of claim 7, wherein the second set of training data identifies (i) an initial training set of products or services purchased by the set of individuals, (ii) the set of offers provided to the set of individuals after the initial training set of products or services is purchased by the set of individuals, and (iii) a subsequent training set of products or services purchased by at least a portion of the set of individuals after purchase of the initial training set of products or services and after the set of offers is provided to the set of individuals.

10. The system of claim 7, wherein the at least one product or service purchased by the user and the additional product or service are for the same type of product or service.

11. The system of claim 7, wherein the at least one processor analyzes, using the second machine learning model, the data identifying the at least one product or service and the user affinity profile to determine a discount associated with purchase of the additional product or service.

12. The system of claim 7, wherein the at least one processor is further configured to:
avail the plurality of user affinity profiles to the entity.

13. A non-transitory computer-readable storage medium configured to store instructions executable by one or more processors, the instructions comprising:
instructions for training a first machine learning model using a first set of training data indicating how a purchased set of products or services is categorized within a set of data structures;
instructions for receiving, from a plurality of electronic devices associated with a plurality of users, a plurality of digital images captured by the plurality of electronic devices;
instructions for analyzing, using an image recognition technique, the plurality of digital images to identify, as included in the plurality of digital images, a plurality of identifiers corresponding to a plurality of products or services purchased by the plurality of users;
instructions for analyzing, using the first machine learning model, (i) data indicating the plurality of products or services purchased by the plurality of users, and (ii) a data structure associated with an entity to determine a plurality of user affinity profiles respectively associated with the plurality of users;
instructions for training a second machine learning model using a second set of training data identifying (i) a training set of products or services purchased by a set of individuals, and (ii) a set of offers provided to the set of individuals in association with the purchase of the training set of products or services by the set of individuals;
instructions for identifying, from the data indicating the plurality of products or services purchased by the plurality of users, at least one product or service associated with the entity andpurchased by a user of the plurality of users;
instructions for analyzing, using the second machine learning model, data identifying the at least one product or service and a user affinity profile of the plurality of user affinity profiles associated with the user of the plurality of users to determine a digital offer for an additional product or service associated with the entity or an additional entity;
instructions for availing the digital offer for review by the user via an electronic device, of the plurality of electronic devices, associated with the user;
instructions for accessing, from a digital image captured by the electronic device associated with the user, an additional set of data indicating whether the additional product or service was purchased by the user; and
instructions for updating the second machine learning model using the additional set of data to enable more accurate digital offer determinations in subsequent analyses.

14. The non-transitory computer-readable storage medium of claim 13, wherein the instructions for training the first machine learning model comprise:
instructions for training the first machine learning model using the first set of training data indicating how the purchased set of products or services is categorized within the set of data structures, wherein the purchased set of products or services is categorized within the set of data structures in a manner that is mutually exclusive and cumulatively exhaustive.

15. The non-transitory computer-readable storage medium of claim 13, wherein the instructions for training the second machine learning model comprise:
instructions for training the second machine learning model using the second set of training data identifying (i) an initial training set of products or services purchased by the set of individuals, (ii) the set of offers provided to the set of individuals after the initial training set of products or services is purchased by the set of individuals, and (iii) a subsequent training set of products or services purchased by at least a portion of the set of individuals after purchase of the initial training set of products or services and after the set of offers is provided to the set of individuals.

16. The non-transitory computer-readable storage medium of claim 13, wherein the at least one product or service purchased by the user and the additional product or service are for the same type of product or service.

17. The non-transitory computer-readable storage medium of claim 13, wherein the instructions for analyzing the set of data and the user affinity profile comprise:
   instructions for analyzing, using the second machine learning model, the data identifying the at least one product or service and the user affinity profile to determine a discount associated with purchase of the additional product or service.

* * * * *